United States Patent
Nakabayashi et al.

(10) Patent No.: US 7,144,961 B2
(45) Date of Patent: Dec. 5, 2006

(54) THERMOPLASTIC ELASTOMER COMPOSITION

(75) Inventors: Hironari Nakabayashi, Osaka (JP); Ryuji Fukuda, Osaka (JP); Taizo Aoyama, Hyogo (JP)

(73) Assignee: Kaneka Corporation, Osaka (JP)

( * ) Notice: Subject to any disclaimer, the term of this patent is extended or adjusted under 35 U.S.C. 154(b) by 179 days.

(21) Appl. No.: 10/481,043

(22) PCT Filed: Jun. 28, 2002

(86) PCT No.: PCT/JP02/06538

§ 371 (c)(1),
(2), (4) Date: Dec. 15, 2003

(87) PCT Pub. No.: WO03/002654

PCT Pub. Date: Jan. 9, 2003

(65) Prior Publication Data

US 2004/0171750 A1 Sep. 2, 2004

(30) Foreign Application Priority Data

Jun. 28, 2001 (JP) ............................. 2001-197425
Jun. 28, 2001 (JP) ............................. 2001-197426
Jul. 10, 2001 (JP) ............................. 2001-209022

(51) Int. Cl.
*C08F 255/08* (2006.01)
*C08F 10/10* (2006.01)
*C08G 77/12* (2006.01)

(52) U.S. Cl. ............. 525/314; 525/240; 525/319; 525/326.3; 525/330.9; 525/342; 526/348.7; 528/31

(58) Field of Classification Search ............. 525/314, 525/240, 319, 330.9, 342, 326.3; 526/348.7; 528/31
See application file for complete search history.

(56) References Cited

U.S. PATENT DOCUMENTS 4,130,534 A 12/1978 Coran et al.
5,266,399 A * 11/1993 Babu et al. .................. 428/343
6,011,116 A 1/2000 Aoyama et al.
6,140,418 A 10/2000 Yamashita et al.
6,218,475 B1 * 4/2001 Hiiro et al. .................. 525/314
6,635,705 B1 * 10/2003 Itoh et al. .................... 524/525

FOREIGN PATENT DOCUMENTS

| EP | 0 844 257 A2 | 5/1998 |
| EP | 0 844 257 A3 | 5/1998 |
| EP | 0 866 096 A1 | 9/1998 |
| JP | 4-180945 A | 6/1992 |
| JP | 262788/1996 | 10/1996 |
| JP | 9-87480 A | 3/1997 |
| JP | 10-101869 | 4/1998 |
| JP | 11-100473 A | 4/1999 |
| JP | 11-100508 A | 4/1999 |
| JP | 2001-106849 A | 4/2001 |
| WO | WO 98/14518 A1 | 4/1998 |

OTHER PUBLICATIONS

International Search Report From Corresponding PCT Application No. PCT/JP02/06538, dated Sep. 26, 2002, 2 pages.
Supplementary European Search Report from Application No. EP 02 73 8845, dated Oct. 29, 2004, 3 pages.
Patent Cooperation Treaty International Preliminary Examination Report (PCT Article 36 and Rule 70), From Corresponding International Application No. PCT/JP02/06538, Dated Aug. 18, 2003, 4 Pages.

* cited by examiner

*Primary Examiner*—James J. Seidleck
*Assistant Examiner*—Olga Asinovsky
(74) *Attorney, Agent, or Firm*—Brinks Hofer Gilson & Lione

(57) ABSTRACT

The present invention provides a thermoplastic elastomer composition which is not only satisfactory in rubber-like characteristics and moldability but also satisfactory in both permanent compression set and vibration damping properties and comprises an unsaturated bond-containing isobutylene polymer (A) and an olefinic resin (B).

13 Claims, No Drawings

THERMOPLASTIC ELASTOMER COMPOSITION

RELATED APPLICATIONS

This application is a nationalization of PCT Application No. PCT/JP02/06538 filed on Jun. 28, 2002. This application claims priority from Japanese Application No. 2001-197425 filed on Jun. 28, 2001: Japanese Application No. 2001-197426 filed on Jun. 28, 2001; and Japanese Application No. 2001-209022 filed on Jul. 10, 2001.

TECHNICAL FIELD

The present invention relates to a thermoplastic elastomer composition.

BACKGROUND TECHNOLOGY

Heretofore, as high polymer materials having rubber-like elasticity, those obtained by formulating a crosslinking agent, a reinforcing agent, and the like in various rubbers, such as natural and synthetic rubbers, and crosslinking the resulting compositions at high temperature and high pressure have been used broadly. However, such rubbers require prolonged crosslinking and molding under high-temperature, high-pressure conditions, thus being poor in processability. Moreover, the crosslinked rubbers do not exhibit thermoplasticity so that, unlike thermoplastic resins, recycle molding is generally infeasible. For this reason, recent years have seen the development of several recyclable thermoplastic elastomers which may be easily reprocessed into shaped articles by utilizing the universal melt-molding techniques such as hot-press molding, injection molding and extrusion molding as it is the case with ordinary thermoplastic resins. As such thermoplastic elastomers, several polymers in the olefin, urethane, ester, styrenic, and vinyl chloride series have been developed and are on the market today.

Among these polymers, styrenic thermoplastic elastomers are highly flexible and exhibit satisfactory rubber-like elasticity at atmospheric temperature. As such styrenic thermoplastic elastomers, styrene-butadiene-styrene block copolymer (SBS), styrene-isoprene-styrene block copolymer (SIS), and the corresponding hydrogenated elastomers such as styrene-ethylenebutylene-styrene block copolymer (SEBS) and styrene-ethylenepropylene-styrene block copolymer (SEPS) are known. However, these block copolymers are inadequate in permanent compression set.

Meanwhile, as a thermoplastic elastomer having good flexibility, exhibiting good rubber-like elasticity at atmospheric temperature, and having satisfactory vibration damping properties, an isobutylene block copolymer comprising a polymer block composed predominantly of isobutylene and a polymer block composed predominantly of an aromatic vinyl compound is known (U.S. Pat. No. 4,276, 394). However, this isobutylene block copolymer has also proved unsatisfactory in the degree of compressive deformation on heating (permanent compression set) and in rubber-like elasticity at high temperature.

Also known is a thermoplastic polymer composition comprising a crosslinking product of an isobutylene block copolymer component containing a polymer block composed predominantly of isobutylene and a rubber component (WO98/14518). This composition is outstanding in gas barrier and sealing properties but has been found to have the drawback that it is still unsatisfactory in permanent compression set, giving a value of 35 to 65 under the condition of 70° C.×22 hours.

Thus, there has not been known a thermoplastic elastomer satisfactory in all of moldability, permanent compression set, and vibration damping properties.

SUMMARY OF THE INVENTION

Developed in the above state of the art, the present invention has for its object to provide a thermoplastic elastomer composition which is not only satisfactory in rubber-like characteristics and moldability but also satisfactory in both permanent compression set and vibration damping properties.

The inventors of the present invention researched in earnest for accomplishing the above object and have found that a thermoplastic elastomer composition comprising an unsaturated bond-containing isobutylene polymer and an olefinic resin is capable of expressing all the above-mentioned characteristics. The present invention has been developed on the basis of the above finding.

The present invention, therefore, is directed to a thermoplastic elastomer composition comprising an unsaturated bond-containing isobutylene polymer (A) and an olefinic resin (B).

The unsaturated bond-containing isobutylene polymer (A) mentioned above is preferably a block copolymer comprising a polymer block (a) composed predominantly of isobutylene and a polymer block (b) composed predominantly of an aromatic vinyl compound. Moreover, in the case where the unsaturated bond-containing isobutylene polymer (A) is the block copolymer mentioned just above, the unsaturated bond-containing isobutylene polymer (A) preferably contains said unsaturated bond within the molecular chain of the polymer block (b) composed predominantly of an aromatic vinyl compound.

Furthermore, the unsaturated bond-containing isobutylene polymer (A) is preferably an alkenyl group-terminated polymer.

It is also preferable that the olefinic resin (B) content should be 10 to 200 weight parts relative to 100 weight parts of the unsaturated bond-containing isobutylene polymer (A).

The unsaturated bond-containing isobutylene polymer (A) is preferably a polymer produced by synthesizing an isobutylene polymer not containing an unsaturated bond in the first place and then introducing an unsaturated bond thereinto.

Furthermore, the unsaturated bond-containing isobutylene polymer (A) is preferably an allyl-terminated polymer produced by causing allyltrimethylsilane to act on a polymer not containing an unsaturated bond at the molecular chain terminus but terminating in a chlorine atom.

In the thermoplastic elastomer composition of the invention, the unsaturated bond-containing isobutylene polymer (A) preferably has an intermolecularly crosslinked structure.

The crosslinking of the unsaturated bond-containing isobutylene polymer (A) may be effected at any of the following stages, i.e. the stage of melt-kneading of the unsaturated bond-containing isobutylene polymer (A) with the olefinic resin (B), a stage preceding the melt-kneading of the unsaturated bond-containing isobutylene polymer (A) with the olefinic resin (B), or a stage following the melt-kneading of the unsaturated bond-containing isobutylene polymer (A) with the olefinic resin (B). Preferably, the crosslinking is effected with a crosslinking agent.

Preferably, the thermoplastic elastomer composition of the present invention comprises a plasticizer (C). The plasticizer (C) is preferably a paraffinic oil.

The unsaturated bond-containing isobutylene polymer (A) is preferably a polymer having a number average molecular weight of 1,000 to 500,000 and containing an average of at least 0.2 unsaturated bond per molecule at the molecular chain terminus.

The unsaturated bond-containing isobutylene polymer (A) contains a monomer unit derived from isobutylene in a proportion of not less than 50 weight % based on the total weight of the polymer (A).

Further, the preferred olefinic resin (B) is polyethylene or polypropylene.

DETAILED DESCRIPTION OF THE INVENTION

The present invention is now described in detail.

The thermoplastic elastomer composition of the invention comprises an unsaturated bond-containing isobutylene polymer (A) and an olefinic resin (B).

Unsaturated Bond-Containing Isobutylene Polymer (A)

The unsaturated bond-containing isobutylene polymer (A) for use in the present invention is not particularly restricted provided that it contains a monomer unit derived from isobutylene and an unsaturated bond.

The structure of said isobutylene polymer may be a homopolymer of isobutylene, a random copolymer of isobutylene, or a block copolymer of isobutylene.

In the case where the isobutylene polymer is a homopolymer of isobutylene or a random copolymer of isobutylene, the monomer unit derived from isobutylene is preferably in a proportion not less than 50 weight %, more preferably not less than 70 weight %, still more preferably not less than 90 weight %, based on the total weight of the polymer (A).

In the case where the isobutylene polymer is a block copolymer of isobutylene, it suffices that the copolymer contains a polymer block composed predominantly of isobutylene and otherwise there is no restriction. Regarding this polymer block composed predominantly of isobutylene, the monomer unit derived from isobutylene is preferably in a proportion not less than 50 weight %, more preferably not less than 70 weight %, still more preferably not less than 90 weight %, based on the total weight of the particular polymer block.

In this connection, the monomer or monomers other than isobutylene in the isobutylene polymer are not particularly restricted provided that they are cationically polymerizable monomer components. Thus, such monomers as aromatic vinyl compounds, aliphatic olefins other than isobutylene, dienes such as isoprene, butadiene, divinylbenzene, etc., vinyl ethers, and β-pinene, among others, can be mentioned. These may be used each independently or in a combination of two or more species.

The particularly preferred block copolymer of isobutylene is one comprising a polymer block (a) composed predominantly of isobutylene and a polymer block (b) composed predominantly of an aromatic vinyl compound. Regarding the polymer block (b) composed predominantly of an aromatic vinyl compound, the monomer unit derived from the aromatic vinyl compound is preferably in a proportion not less than 50 weight %, more preferably not less than 70 weight %, still more preferably not less than 90 weight %, based on the total weight of the particular polymer block.

The aromatic vinyl compound is not particularly restricted but includes styrene, α-methylstyrene, β-methylstyrene, p-methylstyrene, t-butylstyrene, monochlorostyrene, dichlorostyrene, methoxystyrene and indene, among others. These may be used each independently or in a combination of two or more species. Among the compounds mentioned above, styrene, α-methylstyrene, p-methylstyrene and indene are preferred in terms of the balance among cost, physical properties, and productivity. Moreover, two or more species may be chosen from among them and used, if desired.

The monomer or monomers other than the aromatic vinyl compound in said polymer block (b) composed predominantly of an aromatic vinyl compound are not particularly restricted provided that they are cationically polymerizable monomers but, for example, such monomers as aliphatic olefins, dienes, vinyl ethers, and β-pinene can be mentioned.

The relative amount of the polymer block (a) composed predominantly of isobutylene and that of the polymer block (b) composed predominantly of an aromatic vinyl compound in the isobutylene block copolymer are not particularly restricted but, in consideration of the balance between processability and physical properties, it is preferable to insure that the polymer block (a) composed predominantly of isobutylene accounts for 95 to 20 weight % and the polymer block (b) composed predominantly of an aromatic vinyl compound account for 5 to 80 weight %. The particularly preferred proportions are that the polymer block (a) composed predominantly of isobutylene accounts for 90 to 60 weight % and the polymer block (b) composed predominantly of an aromatic vinyl compound accounts for 10 to 40 weight %.

The structure of the isobutylene block copolymer which is preferred in terms of the physical properties and processability of the final composition comprises at least one polymer block (a) composed predominantly of isobutylene and at least two polymer blocks (b) composed predominantly of an aromatic vinyl compound.

The copolymer structure mentioned above is not particularly restricted but includes a triblock structure consisting of (b)-(a)-(b) blocks, a multi-block structure consisting of repeats of the [(b)-(a)] block, and a stellate structure with arms each consisting in a diblock copolymer of (b)-(a) blocks, among others. These may be used each independently or in a combination of two or more species.

Furthermore, such an isobutylene block copolymer may contain at least one of a homopolymer of isobutylene, a random copolymer consisting predominantly of the monomer unit derived from isobutylene, a homopolymer of the aromatic vinyl compound, a random copolymer consisting predominantly of the monomer unit derived from the aromatic vinyl compound, and a diblock copolymer of the (a)-(b) structure. From the standpoint of physical properties and processability, however, the preferred structure contains at least 50 weight % of an isobutylene block copolymer comprising at least one polymer block (a) composed predominantly of isobutylene and at least two polymer blocks (b) composed predominantly of an aromatic vinyl compound.

Isobutylene polymers can be produced by cationic polymerization of isobutylene alone or isobutylene and one or more other monomers.

The unsaturated bond in the isobutylene block copolymer is not particularly restricted provided that it is a carbon-carbon unsaturated bond. Particularly preferred is a carbon-carbon double bond. In the case where the unsaturated bond-containing isobutylene polymer (A) has an intermolecularly crosslinked structure, said unsaturated bond is preferably a bond which is reactive to the crosslinking agent described hereinafter, for example a hydrosilyl group-containing compound or a peroxy compound, or reactive to heat.

The unsaturated bond-containing group in the isobutylene block copolymer includes alkenyl, acryloyl and methacryloyl, among others. The alkenyl mentioned just above includes aliphatic unsaturated hydrocarbon groups, such as vinyl, allyl, methylvinyl, propenyl, butenyl, pentenyl, hexenyl, etc. and cyclic unsaturated hydrocarbon groups, such as cyclopropenyl, cyclobutenyl, cyclopentenyl, cyclohexenyl, and so forth.

Among these, in the case where the crosslinking is effected with a hydrosilyl group-containing compound, allyl group is preferred.

When said crosslinking is effected with a hydrosilyl group-containing compound, hydrosilyl group-containing linear polysiloxane is preferred. When the crosslinking is effected with an organic peroxide, 2,5-dimethyl-2,5-di(t-butylperoxy)hexane is preferred in terms of odor, coloring potential, and scorch stability. Moreover, when heat is used for crosslinking, the temperature condition of not less than 100° C. is preferred.

In the isobutylene polymer (A), the unsaturated bond may be located at the molecular chain terminus of the polymer or in a group pendant from the molecular chain of the polymer, or even be located at both sites. Furthermore, in the case where the isobutylene polymer (A) is a block copolymer comprising a polymer block (a) composed predominantly of isobutylene and a polymer block (b) composed predominantly of an aromatic vinyl compound, the unsaturated bond may be located at the molecular chain terminus of the polymer or, optionally, a group containing the unsaturated bond may be located within the aromatic ring of the monomer unit derived from the aromatic vinyl compound.

The number of unsaturated bonds in the isobutylene polymer (A) is preferably not less than 0.1 per polymer molecule on the average, more preferably not less than 0.2, still more preferably not less than 0.5, especially not less than 1, for a more satisfactory permanent compression set can then be attained. If the number of unsaturated bonds is too large, moldability tends to be sacrificed. Therefore, the average number of unsaturated bonds per polymer molecule preferably not more than 10, more preferably not more than 5.

The unsaturated bond-containing isobutylene polymer (A) can be produced by the cationic copolymerization of a monomer component comprising isobutylene and a monomer containing said unsaturated bond or, alternatively, by modifying an isobutylene polymer not containing an unsaturated bond with an unsaturated bond-containing compound.

More particularly, there may be used a technology which, as disclosed in Japanese Kokai Publication Hei-3-152164 and Japanese Kokai Publication Hei-7-304909, comprises reacting a polymer having a hydroxyl or the like functional group with an unsaturated bond-containing compound to thereby introduce the unsaturated bond into the polymer. Moreover, for introducing an unsaturated bond into a halogen-containing polymer, there can be used a method which comprises carrying out a Friedel-Crafts reaction with an alkenyl phenyl ether, a method comprising a substitution reaction with allyltrimethylsilane or the like in the presence of a Lewis acid, or a method which comprises carrying out a Friedel-Crafts reaction with a phenol compound to introduce a hydroxyl group and, then, carrying out the alkenyl group-introducing reaction referred to above. Furthermore, as disclosed in U.S. Pat. No. 4,316,973, Japanese Kokai Publication Sho-63-105005, and Japanese Kokai Publication Hei-4-288309, the unsaturated bond may be introduced at polymerization of the monomer.

The isobutylene block copolymer containing an unsaturated bond in a pendant group from the molecular chain can also be obtained by modifying the isobutylene block copolymer not containing an unsaturated bond with an unsaturated bond-containing acid chloride and/or acid anhydride.

The above modification, in the case where the isobutylene polymer is a block copolymer comprising a polymer block (a) composed predominantly of isobutylene and a polymer block (b) composed predominantly of an aromatic vinyl compound, can be effected by causing an unsaturated bond-containing acid chloride and/or acid anhydride to act upon the aromatic ring in said polymer block (b). In this connection, the preferred block copolymer is such that the monomer unit derived from the aromatic vinyl compound in said isobutylene block copolymer has been modified preferably by not less than 1% on a molar basis, more preferably by not less than 5% on the same basis.

The unsaturated bond-containing acid chloride for use in the above modification is not particularly restricted provided that it may act on an aromatic ring, thus including methacryloyl chloride, methacryloyl bromide, methacryloyl iodide, acryloyl chloride, acryloyl bromide, acryloyl iodide, crotonyl chloride, crotonyl bromide, and crotonyl iodide, among others. Among these, methacryloyl chloride is advantageous in terms of commercial availability.

The unsaturated bond-containing acid anhydride is not particularly restricted provided that it may act on an aromatic ring, thus including maleic anhydride, phthalic anhydride and so forth. Among these, maleic anhydride is particularly preferred from the standpoint of solubility in the reaction solvent.

These may be used each independently or as a mixture of two or more species.

The modification mentioned above can be made by a procedure which comprises dissolving the isobutylene block copolymer in a solvent and carrying out a Friedel-Crafts reaction with said acid anhydride and/or acid chloride in the presence of a Lewis acid. Further, after completion of the polymerization reaction of said isobutylene block copolymer, said modification may be made by adding said acid chloride and/or acid anhydride to the polymerization reaction mixture and, if necessary, adding a Lewis acid as well.

By the modification with said acid chloride and/or acid anhydride, the polymer block composed predominantly of an aromatic vinyl compound can be provided with at least one unit represented by the following formula (I), on the average.

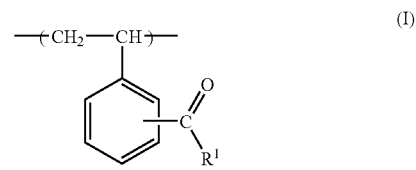

In the formula, $R^1$ represents an unsaturated bond-containing univalent organic group.

By means of the above modification, the molecular chain of the isobutylene block copolymer can be provided with an unsaturated bond.

The number average molecular weight of the unsaturated bond-containing isobutylene polymer (A) is not particularly restricted but is preferably 1,000 to 500,000, particularly 2,000 to 400,000. If the number average molecular weight is less than 1,000, the necessary mechanical and other characteristics will not be sufficiently expressed. If it exceeds 500,000, moldability will deteriorate drastically. The number average molecular weight is measured by using gel permeation chromatography technique. In the gel permeation chromatography measurement, samples are analyzed by using chloroform, tetrahydrofuran or dimethylformamide as an eluent, polystyrene gel column, and polystyrene standard sample as the criterion.

Olefinic Resin (B)

The olefinic resin (B) is not particularly restricted insofar as the hitherto-known species can be employed but an olefin homopolymer or copolymer with the combined ethylene and $C_{3-20}$, α-olefin content being 50 to 100 mol % is preferred. Particularly preferred are polyethylenes such as a homopolymer of ethylene, a copolymer of ethylene with not more than 5 mol % of an α-olefin monomer, and a copolymer of ethylene with not more than 1 mol % of a nonolefinic monomer having a functional group consisting exclusively of carbon, oxygen and hydrogen atoms (specifically, the so-called low-density polyethylene and high-density polyethylene can be mentioned); polypropylenes such as an intrinsically crystalline homopolymer of propylene and an intrinsically crystalline copolymer of propylene and an α-olefin monomer, of which the propylene unit accounts for not less than 50 mol %.

Furthermore, in terms of effects on the crosslinking of the unsaturated bond-containing isobutylene polymer, the olefinic resin (B) is preferably a resin not containing an unsaturated bond.

The formulating level of the olefinic resin (B) per 100 weight parts of the unsaturated bond-containing isobutylene polymer (A) is preferably 10 to 300 weight parts, more preferably 10 to 200 weight parts, still more preferably 20 to 200 weight parts. If the formulating level of the olefinic resin (B) exceeds 300 weight parts, the degree of improvement in permanent compression set tends to be insufficient. If it is less than 10 weight parts, moldability tends to be sacrificed.

Crosslinking

In order that a more satisfactory permanent compression set may be attained, the thermoplastic elastomer of the invention preferably has a crosslinked polymer structure. It may be an elastomer in which the unsaturated bond-containing isobutylene copolymer (A) as such has been intermolecularly crosslinked, the olefinic resin (B) as such has been intermolecularly crosslinked, or the unsaturated bond-containing isobutylene copolymer (A) and olefinic resin (B) have been crosslinked to each other. However, the structure in which the unsaturated bond-containing isobutylene copolymer (A) has been crosslinked between its molecules is preferred, for a particularly satisfactory permanent compression set can then be attained.

In the case where the unsaturated bond-containing isobutylene copolymer (A) has an intermolecularly crosslinked structure, the crosslinking is preferably a crosslinking involving the unsaturated bond contained in the isobutylene copolymer (A). In this case, the olefinic resin (B) is preferably not crosslinked.

The above-mentioned crosslinking may be effected in the stage where the unsaturated bond-containing isobutylene polymer (A) and olefinic resin (B) are melt-kneaded together, in a stage preceding the melt-kneading of the unsaturated bond-containing isobutylene polymer (A) and olefinic resin (B), or separately after the melt-kneading of the unsaturated bond-containing isobutylene polymer (A) and olefinic resin (B). However, it is particularly recommendable to carry out the crosslinking, so-called the dynamic crosslinking at melt-kneading of the unsaturated bond-containing isobutylene polymer (A) and olefinic resin (B), for a particularly satisfactory permanent compression set can then be obtained.

The means of crosslinking may be a known one and is not particularly restricted. As examples, crosslinking by heating and crosslinking with the aid of a crosslinking agent can be mentioned.

For the crosslinking by heating, the polymer may be heated to about 100° C. to 230° C.

The crosslinking agent for use in said crosslinking reaction with the aid of a crosslinking agent is not particularly restricted insofar as the polymer may be crosslinked but a hydrosilyl group-containing compound or a radical crosslinking agent is preferred because the crosslinking can then be efficiently accomplished by exploiting the unsaturated bond of the isobutylene polymer (A). The hydrosilyl group-containing compound is particularly beneficial in the case where the isobutylene polymer (A) is a polymer terminating in an unsaturated bond.

The hydrosilyl group-containing compound is not particularly restricted but a variety of compounds can be employed. For example, there can be used linear polysiloxanes represented by the general formula (II) or (III):

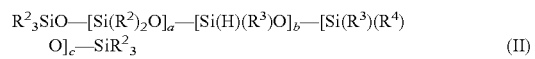

(II)

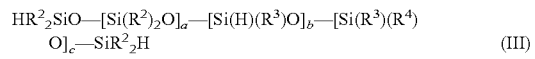

(III)

in the formula, $R^2$ and $R^3$ each independently represents an alkyl group of 1 to 6 carbon atoms or a phenyl group; $R^4$ represents an alkyl or aralkyl group of 1 to 10 carbon atoms; a, b, and c are integers satisfying the relations $0 \leq a \leq 100$, $2 \leq b \leq 100$, and $0 \leq c \leq 100$, respectively and cyclic siloxanes represented by the general formula (IV):

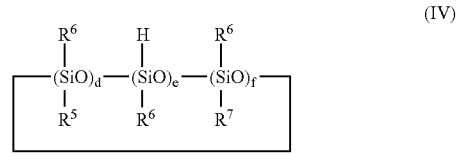

(IV)

in the formula, $R^5$ and $R^6$ each independently represents an alkyl group of 1 to 6 carbon atoms or a phenyl group; $R^7$ represents an alkyl or aralkyl group of 1 to 10 carbon atoms; d, e, and f are integers satisfying the relations $0 \leq d \leq 8$, $2 \leq e \leq 10$ and $0 \leq f \leq 8$, respectively, and further satisfying the relation $3 \leq d+e+f \leq 10$. Furthermore, among the above hydrosilyl (Si—H) group-containing compounds, those compounds which may be represented by the following general formula (V) are particularly preferred in terms of compatibility between the components (A) and (B).

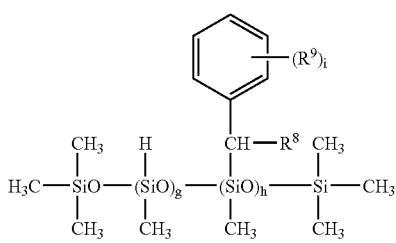

(V)

In the formula, g and h are integers satisfying the relations $2 \leq g+h \leq 50$, $2 \leq g$, and $0 \leq h$; $R^8$ represents a hydrogen atom or a methyl group; $R^9$ represents a hydrocarbon group of 2 to 20 carbon atoms and may optionally have one or more aromatic rings; i is an integer of $0 \leq i \leq 5$.

While the unsaturated bond-containing isobutylene polymer (A) and the hydrosilyl group-containing compound may be admixed in any desired ratio, it is preferable from curability points of view that the molar ratio of the unsaturated bond to the hydrosilyl group should be within the range of 5 to 0.2. The range of 2.5 to 0.4 is still more preferred. If the molar ratio referred to above exceeds 5, curability tends to be insufficient so that occasionally only a tacky product of low strength may be obtained on curing. If the ratio is less than 0.2, many active hydrosilyl groups will remain after curing so that the cured product may develop cracks and voids, thus being deficient in homogeneity and strength.

The crosslinking reaction of the unsaturated bond-containing isobutylene polymer (A) and the hydrosilyl group-containing compound proceeds as the two materials are blended and heated but in order to hasten the reaction, a hydrosilylation catalyst can be added. The hydrosilylation catalyst that can be used for this purpose is not particularly restricted but includes radical initiators, such as organic peroxides and azo compounds, and transition metal catalysts, among others.

The radical initiator referred to above is not particularly restricted but includes dialkyl peroxides, such as di-t-butyl peroxide, 2,5-dimethyl-2,5-di(t-butylperoxy)hexane, 2,5-dimethyl-2,5-di(t-butylperoxy)-3-hexyne, dicumyl peroxide, t-butylcumyl peroxide, α,α'-bis(t-butylperoxy)isopropylbenzene, etc.; diacyl peroxides, such as benzoyl peroxide, p-chlorobenzoyl peroxide, m-chlorobenzoyl peroxide, 2, 4-dichlorobenzoyl peroxide, lauroyl peroxide, etc.; peracid esters, such as t-butyl perbenzoate; peroxydicarbonates, such as diisopropyl peroxydicarbonate, di-2-ethylhexyl peroxydicarbonate, etc.; and peroxyketals, such as 1,1-di(t-butylperoxy)cyclohexane, 1,1-di(t-butylperoxy)-3,3,5-trimethylcyclohexane, etc. and so forth.

The azo compound referred to above is not particularly restricted but includes 2,2'-azobis-isobutyronitrile, 2,2'-azobis-2-methylbutyronitrile, 1,1'-azobis-1-cyclohexane carbonitrile and so forth.

The transition metal catalyst referred to above is not particularly restricted but includes platinum metal, a solid platinum dispersion on a matrix such as alumina, silica, carbon black, or the like, chloroplatinic acid, complexes of chloroplatinic acid with alcohols, aldehydes or ketones, platinum-olefin complexes, platinum(O)-dialkenyltetramethyldisiloxanes, and so forth. As transition metal catalysts other than platinum compounds, there may be mentioned RhCl(PPh$_3$)$_3$, RhCl$_3$, RuCl$_3$, IrCl$_3$, FeCl$_3$, AlCl$_3$, PdCl$_2$.H$_2$O, NiCl$_2$, and TiCl$_4$, by way of example.

These hydrosilylation catalysts can be used each independently or in a combination of two or more species.

The level of use of the hydrosilylation catalyst is not particularly restricted but, for each mol of the unsaturated bond in component (A), the catalyst is used preferably within the range of $10^{-1}$ to $10^{-8}$ mol, more preferably within the range of $10^{-3}$ to $10^{-6}$ mol. If the amount of the catalyst is less than $10^{-8}$ mol, the curing reaction may not proceed sufficiently depending on cases. On the other hand, because any hydrosilylation catalyst is expensive, it is advisable to refrain from using the catalyst in excess over $10^{-1}$ mol.

Among the above-mentioned catalysts, platinum-vinylsiloxane is the most advantageous in terms of compatibility, crosslinking efficiency, and scorch stability.

The radical crosslinking agent which can be used as the crosslinking agent according to the invention is not particularly restricted but an organic peroxide, among others, is generally used. The organic peroxide is not particularly restricted but includes dialkyl peroxides, such as di-t-butyl peroxide, 2,5-dimethyl-2,5-di(t-butylperoxy)hexane, 2,5-dimethyl-2,5-di(t-butylperoxy)-3-hexyne, dicumyl peroxide, t-butylcumyl peroxide, α,α'-bis(t-butylperoxy)isopropylbenzene, etc.; diacyl peroxides, such as benzoyl peroxide, p-chlorobenzoyl peroxide, m-chlorobenzoyl peroxide, 2,4-dichlorobenzoyl peroxide, lauroyl peroxide, etc.; peracid esters, such as t-butyl perbenzoate etc.; peroxydicarbonates, such as diisopropyl peroxydicarbonate, di-2-ethylhexyl peroxydicarbonate, etc.; and peroxyketals, such as 1,1-di(t-butylperoxy)cyclohexane, 1,1-di(t-butylperoxy)-3,3,5-trimethylcyclohexane, etc. and so forth. Among these, 2,5-dimethyl-2,5-di(t-butylperoxy)hexane and 2,5-dimethyl-2,5-di(t-butylperoxy)-3-hexyne are preferred in terms of odor, coloring potential, and scorch stability.

The level of use of the organic peroxide is preferably 0.5 to 5 weight parts per 100 weight parts of the isobutylene polymer (A) at the time of addition of the organic peroxide.

In the case where an organic peroxide is used as the crosslinking agent, an auxiliary crosslinking agent having an ethylenically unsaturated group may be further formulated. The auxiliary crosslinking agent having an ethylenically unsaturated group includes polyfunctional vinyl monomers, such as divinylbenzene, triallyl cyanurate, etc., and polyfunctional methacrylate monomers, such as ethylene glycol dimethacrylate, diethylene glycol dimethacrylate, triethylene glycol dimethacrylate, polyethylene glycol dimethacrylate, trimethylolpropane trimethacrylate, allyl methacrylate and so forth. These may be used each independently or in a combination of two or more species. By using such a compound as above in combination with said organic peroxide, a more uniform and efficient crosslinking reaction can be expected.

Among the above compounds, ethylene glycol dimethacrylate and triethylene glycol dimethacrylate are preferred because they are not only easy to handle but also have a solubilizing effect on the peroxide and act as an auxiliary dispersant for the peroxide, thus making the effect of crosslinking uniform and pronounced and, hence, a thermoplastic elastomer balanced in hardness and rubberlike elasticity is more certainly obtained.

The level of addition of said auxiliary crosslinking agent is preferably within the range of 0.5 to 10.0 weight parts per 100 weight parts of the isobutylene polymer (A) at the time of addition. If the level of addition of the auxiliary crosslinking agent is lower than 0.5 weight parts, the contributory effect on crosslinking will not be obtained. If it exceeds 10 weight parts, the auxiliary crosslinking agent itself undergoes gelation to adversely affect physical properties and increase the cost.

Optional Ingredients

In addition to the isobutylene polymer (A) and olefinic resin (B), the thermoplastic elastomer composition of the invention preferably contains a plasticizer (C) for improved moldability and flexibility.

As the plasticizer (C), the mineral oil for use in the processing of rubber or a liquid or low-molecular weight synthetic softening agent can be used.

The mineral oil includes paraffinic oils, naphthenic oils, and aromatic high-boiling petroleum fractions, although paraffinic and naphthenic oils which do not interfere with the crosslinking reaction are preferred.

The liquid or low-molecular weight synthetic softening agent is not particularly restricted but includes polybutene, hydrogenated polybutene, liquid polybutadiene, hydrogenated liquid polybutadiene, polyisobutylene, and poly($\alpha$-olefins), among others.

These species of plasticizer (C) may be used each independently or in a suitable combination.

The formulating level of said plasticizer (C) is preferably 1 to 300 weight parts per 100 weight parts of the unsaturated bond-containing isobutylene polymer (A). If the formulating level exceeds 300 weight parts, mechanical strength and moldability tend to be adversely affected.

The most desirable formulation for the thermoplastic elastomer composition of the invention, based on 100 weight parts of said unsaturated bond-containing isobutylene polymer (A), is the olefinic resin (B): 20 to 200 weight parts and the plasticizer (C): 10 to 300 weight parts.

The thermoplastic elastomer composition of the invention may be further supplemented with various other ingredients or additives suited to the specific characteristics required of each end use within the range not adversely affecting physical properties; for example various reinforcing agents, fillers, elastomers such as styrene-butadiene-styrene block copolymer (SBS) and styrene-isoprene-styrene block copolymer (SIS), the corresponding hydrogenated styrene-ethylenebutylene-styrene block copolymer (SEBS) and styrene-ethylenepropylene-styrene block copolymer (SEPS), etc., hindered phenol or hindered amine series antioxidants, ultraviolet absorbers, light stabilizers, pigments, surfactants, flame retardants, fillers, reinforcing agents, and so forth, each in an appropriate proportion.

Method of Producing the Thermoplastic Elastomer of the Invention

The method of producing the thermoplastic elastomer composition of the invention is not particularly restricted but may be any method that provides for uniform blending of the unsaturated bond-containing isobutylene polymer (A), olefinic resin (B), and said optional components.

In the case where the thermoplastic elastomer composition of the invention is to be produced by conducting a crosslinking reaction at the stage of melt-kneading of said unsaturated bond-containing isobutylene polymer (A) and olefinic resin (B), any of following procedures can be used with advantage.

The procedure using a closed type mill or a batch mill, such as Labo Plastomill, Banbury mixer, kneader, roll mill or the like comprises melt-kneading all the component materials but the crosslinking agent and auxiliary crosslinking agent until a homogeneous mixture is obtained, adding the crosslinking agent, optionally together with the auxiliary crosslinking agent, and allowing the crosslinking reaction to proceed far enough until the melt-kneading is no longer feasible.

The procedure employing a continuous melt-kneading machine, such as a single-screw extruder, a twin-screw extruder or the like, comprises melt-kneading all the component materials but the crosslinking agent and auxiliary crosslinking agent until a homogeneous mixture is obtained, pelletizing the mixture, dry-blending the pellets with the crosslinking agent, optionally together with the auxiliary crosslinking agent, and further melt-kneading the dry blend by means of a melt-kneading machine, such as an extruder, to give a thermoplastic elastomer composition in which the unsaturated bond-containing isobutylene polymer (A) and/or olefinic resin (B) has been dynamically crosslinked. An alternative method comprises melt-kneading all the component materials but the crosslinking agent and auxiliary crosslinking agent with a melt-kneading machine such as an extruder, adding the crosslinking agent, optionally together with the auxiliary crosslinking agent, partway of the cylinder of the extruder, and melt-kneading the mixture further to give a thermoplastic elastomer composition in which the unsaturated bond-containing isobutylene polymer (A) and/or the olefinic resin (B) has been dynamically crosslinked.

In carrying out the above procedure for concurrent melt-kneading and crosslinking, the melt-kneading is preferably carried out under heating at about 140 to 210° C.

For producing the thermoplastic elastomer composition of the invention by causing the unsaturated bond-containing isobutylene polymer (A) to crosslink in advance and blending the crosslinked polymer with the olefinic resin (B), the following procedure, for instance, can be used with advantage.

Thus, the thermoplastic elastomer composition of the invention can be produced by adding the crosslinking agent, optionally together with the auxiliary crosslinking agent, and other additive materials to the unsaturated bond-containing isobutylene polymer (A), kneading the mixture thoroughly at a suitable temperature by means of a kneader which is conventionally used in the manufacture of crosslinked rubber products, feeding the kneaded mass to a hot-press machine or the like and allowing it to crosslink at a suitable temperature for a suitable time, cooling the reaction mixture, and crushing it to give a crosslinked isobutylene polymer (A), and melt-kneading this crosslinked polymer and the olefinic resin (B) together to give the thermoplastic elastomer composition of the invention.

In this connection, as the method of melt-kneading the crosslinked polymer of unsaturated bond-containing isobutylene polymer (A) with the olefinic resin (B), any of the known techniques heretofore in use for the production of thermoplastic resin or thermoplastic elastomer compositions can be employed and carried into practice by using a melt-kneading machine such as Labo Plastomill, Banbury mixer, single-screw extruder, twin-screw extruder or the like. The preferred melt-kneading temperature is 140 to 210° C.

For producing the thermoplastic elastomer composition of the invention by kneading the unsaturated bond-containing isobutylene polymer (A) and olefinic resin (B) together and, then, carrying out a crosslinking reaction independently, the procedures mentioned above can be used in combination according to need.

Uses for the Thermoplastic Elastomer of the Invention

The thermoplastic elastomer composition of the present invention can be molded by the molding technology and device in routine use for thermoplastic resin compositions, that is to say by melt-molding, such as extrusion molding, injection molding, press molding, blow molding, and so forth.

Since the thermoplastic elastomer composition of the invention has very satisfactory moldability, permanent compression set and vibration damping properties, it can be used with advantage in a variety of applications, such as sealing materials, e.g. packing, sealants, gaskets, plugs, etc., CD dampers, architectural dampers, vibration damping materials for automobiles and other road vehicles, household electrical appliances, etc., vibration preventing materials, car upholstery, cushioning materials, sundry goods, electrical parts, electronic parts, members of sporting goods, grips or cushioning pads, electric conductor sheaths, packaging materials, various vessels, and stationery articles.

BEST MODE FOR CARRYING OUT THE INVENTION

The following examples illustrate the present invention in further detail without defining the scope of the invention.

Before presenting the examples, the various methods of determinations and various evaluation methods used are described.

Hardness

In accordance with JIS A 6352; a 12.0 mm-thick pressed sheet was used as the testpiece.

Permanent Compression Set

In accordance with JIS K 6262; a 12.0 mm-thick pressed sheet was used as the testpiece. The measuring conditions were 100° C.×22 hr and 25% deformation.

Dynamic Viscoelasticity

In accordance with JIS K 6394 (Testing Methods for Dynamic Properties of Vulcanized Rubber and Thermoplastic Rubber); a testpiece measuring 6 mm long×5 mm wide×2 mm thick was cut out and using the dynamic viscoelasticity measuring apparatus DVA-200 (manufactured by IT Instrumental Control), the loss tangent tan δ value was determined. The measuring frequency was 0.5 Hz.

Melting Viscosity

Test conditions: measured by using a capillary rheometer (manufactured by Toyo Seiki Seisaku-sho) with a die radius of 1 mm at a testing temperature of 170° C.

Thermoplasticity

The testpiece was milled with Labo Plastomill (manufactured by Toyo Seiki Seisaku-sho) set to 170° C. and it was investigated whether the melt could be remolded.

○; Plasticized by heating at 170° C.; The surface condition of the resulting sheet was satisfactory.

Δ; Plasticized by heating at 170° C.; The surface condition of the resulting sheet was not satisfactory.

X; Not plasticized by heating at 170° C.

The abbreviations used for various materials in the following examples and comparative examples and the particulars of each material are given below.

Component (A): f-SIBS: a polystyrene-polyisobutylene-polystyrene triblock copolymer having a methacryloyl group pendant from the molecular chain (prepared in Production Example 2 below)

Component (A): ARSIBS: a polystyrene-polyisobutylene-polystyrene tribldck copolymer having an allyl group at the molecular chain terminus (prepared in Production Example 3 below)

Component (A): ARPIB: a polyisobutylene having an allyl group at the molecular chain terminus, EP 600A, product of Kaneka Corporation.

Component (B) HDPE: a high-density polyethylene, product of Mitsui Petrochemical (™Hizex 8000F)

Component (B) PP1: a polypropylene, product of Grand Polymer (™Grand Polypro J300)

Component (B) PP2: a polypropylene: product of Mitsui Chemical (™Hipol J300)

Component (B): PP3: a polypropylene, product of Grand Polymer (™Grand Polypro J709W)

IIR: butyl rubber, product of JSR (™Butyl065)

SIBS: a polystyrene-polyisobutylene-polystyrene triblock copolymer having no unsaturated bond Component (C): plasticizer: a paraffinic process oil, product of Idemitsu Petrochemical (™Diana Process Oil PW-90)

Crosslinking agent 1: 2,5-dimethyl-2,5-di(t-butylperoxy)hexane, product of Nippon Oils and Fat (™Perhexa 25B)

Crosslinking agent 2: a reaction-type brominated alkylphenol formaldehyde compound, product of Taoka Chemical Company (™Tackirol 250-1)

Crosslinking agent 3: a linear siloxane having an average of 5 hydrosilyl groups and an average of 5 α-methylstyrene groups per molecule Auxiliary crosslinking agent 1: ethylene glycol dimethacrylate, product of Kanto Chemical Auxiliary crosslinking agent 2: zinc oxide Auxiliary crosslinking agent 3: stearic acid Hydrosilylation catalyst: platinum(O)-1,1,3,3-tetramethyl-1,3-diallyldisiloxane complex, 1% solution in xylene

PRODUCTION EXAMPLE 1

[Production of a Polystyrene-Polyisobutylene-Polystyrene Triblock Copolymer not Containing an Unsaturated Bond]

The polymerization vessel in a 2 L separable flask, after nitrogen purging, was charged with 456.1 mL of n-hexane (dried with molecular sieves) and 656.5 ml of butyl chloride (dried with molecular sieves) using an injection syringe and the polymerizaiton vessel was cooled by immersion in a dry ice/methanol bath at −70° C. Then, a Teflon liquid delivery tube was connected to a pressure-resisting glass liquefaction sampling tube equipped with a 3-way cock and containing 232 mL (2871 mmol) of isobutylene monomer and the isobutylene monomer was delivered under nitrogen pressure to the polymerization vessel. Then, 0.647 g (2.8 mmol) of p-dicumyl chloride and 1.22 g (14 mmol) of N,N-dimethylacetamide were added, further followed by addition of 8.67 mL (79.1 mmol) of titanium tetrachloride. The reaction mixture was stirred at the same temperature for 1.5 hours after the start of polymerization and about 1 mL of the polymer slurry was withdrawn as a sample. Then, a mixed solution composed of 77.9 g (748 mmol) of styrene monomer, 23.9 mL of n-hexane, and 34.3 mL of butyl chloride, cooled to −70° C. in advance, was fed to the polymerization vessel. Forty-five minutes following addition of the above mixed solution, about 40 mL of methanol was added to the reaction mixture to terminate the reaction.

After the solvent and the like were distilled off from the reaction mixture, the residue was dissolved in toluene and washed with two portions of water. The toluene solution was poured in a large quantity of methanol to precipitate the polymer and the polymer thus Obtained was dried in vacuo at 60° C. for 24 hours to recover the objective block copolymer. The molecular weight of this polymer was determined by gel permeation chromatography (GPC). Whereas the isobutylene polymer prior to addition of styrene had an Mn value of 50,000 and an Mw/Mn ratio of 1.40, the block copolymer obtained after the polymerization of styrene had an Mn value of 67,000 and an Mw/Mn value of 1.50.

PRODUCTION EXAMPLE 2

[Production of a Polystyrene-Polyisobutylene-Polystyrene Triblock Copolymer Having a Methacryloyl Group Pendant from the Molecular Chain (f-SIBS)]

A 2 L separable flask was charged with 75 g of the polystyrene-polyisobutylene-polystyrene triblock copolymer prepared in Production Example 1 (styrene content 30%, the number of mols of the styrene unit: 0.216 mol), followed by nitrogen purging. Using an injection syringe, 1200 mL of n-hexane (dried with molecular sieves) and 1800 mL of butyl chloride (dried with molecular sieves) were added. Then, using a syringe, 30 g (0.291 mol) of methacryloyl chloride was added. Finally, with the solution under stirring, 39.4 g (0.295 mol) of aluminum trichloride was added so as to initiate the reaction. At 30 minutes following the start of reaction, about 1000 ml of water was added to the reaction mixture with vigorous stirring to terminate the reaction.

The reaction mixture was washed with a large quantity of water at least 5 times. Then, a large quantity of a solvent mixture of methanol and acetone (1:1, vt/vt) was gently added dropwise to precipitate the polymer and the polymer thus obtained was dried in vacuo at 60° C. for 24 hours to give the objective block copolymer.

PRODUCTION EXAMPLE 3

[Production of a Polystyrene-Polyisobutylene-Polystyrene Triblock Copolymer Having an Allyl Group at the Molecular Chain Terminus (ARSIBS)]

The polymerization vessel of a 2 L separable flask was subjected to nitrogen purging, and using an injection syringe, 456.1 mL of n-hexane (dried with molecular sieves) and 656.5 mL of butyl chloride (dried with molecular sieves) were added. The polymerization vessel was cooled by immersion in a dry ice/methanol bath at −70° C. Then, a Teflon liquid delivery tube was connected to a pressure-resisting glass liquefaction sampling tube equipped with a 3-way cock and containing 201 mL (2132 mmol) of isobutylene monomer and the isobutylene monomer was delivered under nitrogen pressure to the polymerization vessel. Then, 2.6 g (11.2 mmol) of p-dicumyl chloride and 1.22 g (14 mmol) of N,N-dimethylacetamide were added, further followed by addition of 9.9 mL (90.0 mmol) of titanium tetrachloride. The reaction mixture was stirred at the same temperature for 1.5 hours after the start of polymerization and about 1 mL of the polymer slurry was withdrawn as a sample. Then, a mixed solution composed of 52 g (499 mmol) of styrene monomer, 23.9 mL of n-hexane, and 34.3 mL of butyl chloride, cooled to −70° C. in advance, was added to the polymerization vessel. Forty-five minutes following addition of the above mixed solution, about 12 mL (10.0 mmol) of allyltrimethylsilane was added to the vessel. The reaction mixture was stirred at the prevailing temperature for 60 minutes, at the end of which time about 40 mL of methanol was added so as to terminate the reaction.

After the solvent and the like were distilled off from the reaction mixture, the residue was dissolved in toluene and washed with two portions of water. This toluene solution was poured in a large quantity of methanol to precipitate the polymer and the polymer thus obtained was dried in vacuo at 60° C. for 24 hours to recover the objective block copolymer. The molecular weight of this polymer was measured by gel permeation chromatography (GPC). Whereas the isobutylene polymer prior to addition of styrene had an Mn value of 10500 and an Mw/Mn ratio of 1.40, the block copolymer obtained after the polymerization of styrene had an Mn value of 15000 and an Mw/Mn value of 1.50.

EXAMPLE 1

Using Labo Plastomill (manufactured by Toyo Seiki Seisaku-sho) set to 180° C., the f-STBS prepared in Production Example 2, HDPE, and plasticizer were melt-kneaded in the ratio indicated in Table 1 for 5 minutes. Then, crosslinking agent 1 and auxiliary crosslinking agent 1 were added in the proportions indicated in Table 1 and the melt-kneading for dynamic crosslinking was carried out at 180° C. until the torque value had reached a peak level. The resulting thermoplastic elastomer composition could be easily molded into a sheet by using the Sintoh Metal's hot-press at 180° C. The hardness, permanent compression set, and thermoplasticity of the sheet were measured by the methods described above. The physical values of the sheet are presented in Table 1.

EXAMPLE 2

Except that the formulating level of the plasticizer was changed to 100 weight parts, the procedure of Example 1 was otherwise repeated to mold the resin composition into a sheet and evaluate its physical properties. The physical values of the sheet are presented in Table 1.

EXAMPLE 3

Except that the formulating level of HDPE was changed to 35 weight parts, the procedure of Example 1 was otherwise repeated to mold the resin composition into a sheet and evaluate its physical properties. The physical values of the sheet are presented in Table 1.

EXAMPLE 4

Except that 15 weight parts of HDPE and 40 weight parts of PP1 were used in lieu of 50 weight parts of HDPE, the procedure of Example 1 was otherwise repeated to mold the resin composition into a sheet and evaluate its physical properties. The physical values of the sheet are presented in Table 1.

EXAMPLE 5

Except that 50 weight parts of PP1 was used in lieu of HDPE, the procedure of Example 1 was otherwise repeated to mold the resin composition into a sheet and evaluate its physical properties. The physical values of the sheet are presented in Table 1.

COMPARATIVE EXAMPLE 1

The SIBS prepared in Production Example 1 was melt-kneaded by Labo Plastomill at 180° C. for 10 minutes and, then, molded into a sheet at 180° C. The hardness, permanent compression set, and thermoplasticity of the sheet were measured by the methods described hereinbefore. The physical values of the sheet are presented in Table 2.

COMPARATIVE EXAMPLE 2

The f-SIBS prepared in Production Example 2 was melt-kneaded with Labo Plastomill at 180° C. for 10 minutes, after which crosslinking agent 1 and auxiliary crosslinking agent 1 were added in the proportions indicated in Table 2, and the melt-kneading was further continued at 180° C. The kneaded mass was then molded into a sheet at 180° C. The hardness, permanent compression set, and thermoplasticity of the sheet were measured by the methods described hereinbefore. The physical values of the sheet are presented in Table 2.

COMPARATIVE EXAMPLE 3

Using Labo Plastomill (manufactured by Toyo Seiki Seisaku-sho) set to 180° C., the SIBS prepared in Production Example 1, HDPE, and plasticizer were melt-kneaded in the ratio indicated in Table 2 for 5 minutes. Then, crosslinking agent 1 and auxiliary crosslinking agent 1 were added in the proportions indicated in Table 2 and the melt-kneading for dynamic crosslinking was carried out at 180° C. until the torque value had reached a peak level. The resulting composition was molded into a sheet by Shintoh Metal's hot-press and the hardness, permanent compression set, and thermoplasticity of the sheet were measured by the methods described hereinbefore. The physical values of the sheet are presented in Table 2.

COMPARATIVE EXAMPLE 4

Using Labo Plastomill (manufactured by Toyo Seiki Seisaku-sho) set to 180° C., the SIBS prepared in Production Example 1 and IIR were melt-kneaded in the ratio indicated in Table 2 for 5 minutes. Then, crosslinking agent 2, auxiliary crosslinking agent 2, and auxiliary crosslinking agent 3 were added in the proportions indicated in Table 2 and the melt-kneading for dynamic crosslinking was carried out at 180° C. until the torque value had reached a peak level. The resulting composition was molded into a sheet by using Shintoh Metal's hot-press and the hardness, permanent compression set, and thermoplasticity of the sheet were measured by the methods described hereinbefore. The physical values of the sheet are presented in Table 2.

COMPARATIVE EXAMPLE 5

Using Labo Plastomill (manufactured by Toyo Seiki Seisaku-sho) set to 180° C., the SIBS prepared in Production Example 1 and PP1 were melt-kneaded in the ratio indicated in Table 2 for 5 minutes to give a desired composition. The resulting composition was molded into a sheet by using Shintoh Metal's hot-press and the hardness, permanent compression set, and thermoplasticity of the sheet were measured by the methods described hereinbefore. The physical values of the sheet are presented in Table 2.

COMPARATIVE EXAMPLE 6

Using Labo Plastomill (manufactured by Toyo Seiki Seisaku-sho) set to 180° C., the SIBS prepared in Production Example 1, PP1 and plasticizer were melt-kneaded in the ratio indicated in Table 2 for 5 minutes to give a desired composition. The resulting composition was molded into a sheet by using Shintoh Metal's hot-press and the hardness, permanent compression set, and thermoplasticity of the sheet were measured by the methods described hereinbefore. The physical values of the sheet are presented in Table 2.

COMPARATIVE EXAMPLE 7

Using Labo Plastomill (manufactured by Toyo Seiki Seisaku-sho) set to 180° C., the SIBS prepared in Production Example 1, PP1 and plasticizer were melt-kneaded in the ratio indicated in Table 2 for 5 minutes to give a desired composition. The resulting composition was molded into a sheet by using Shintoh Metal's hot-press and the hardness, permanent compression set, and thermoplasticity of the sheet were measured by the methods described hereinbefore. The physical values of the sheet are presented in Table 2.

COMPARATIVE EXAMPLE 8

Using Labo Plastomill (manufactured by Toyo Seiki Seisaku-sho) set to 180° C., the ARSIBS prepared in Production Example 3, PP1 and plasticizer were melt-kneaded in the ratio indicated in Table 2 for 5 minutes to give a desired composition. The resulting composition was subjected to molding using Shintoh Metal's hot-press, however, it could not be molded. The thermoplasticity of the composition was measured by the methods described hereinbefore. The result of the composition is presented in Table 2.

COMPARATIVE EXAMPLE 9

Using Labo Plastomill (manufactured by Toyo Seiki Seisaku-sho) set to 180° C., the ARPIB, PP1 and plasticizer were melt-kneaded in the ratio indicated in Table 2 for 5 minutes to give a desired composition. The resulting composition was subjected to molding using Shintoh Metal's hot-press, however, it could not be molded. The thermoplasticity of the composition was measured by the methods described hereinbefore. The result of the composition is presented in Table 2.

TABLE 1

|  | Ex. | | | | |
| --- | --- | --- | --- | --- | --- |
|  | 1 | 2 | 3 | 4 | 5 |
| f-SIBS (Weight parts) | 100 | 100 | 100 | 100 | 100 |
| HDPE (Weight parts) | 50 | 50 | 35 | 15 | — |
| PP1 (Weight parts) | — | — | — | 40 | 50 |
| Plasticizer (Weight parts) | 60 | 100 | 60 | 60 | 60 |
| Crosslinking agent 1 (Weight parts) | 3 | 3 | 3 | 3 | 3 |
| Auxiliary crosslinking agent 1 (Weight parts) | 5 | 5 | 5 | 5 | 5 |
| Hardness (JIS A: immediately after press) | 80 | 67 | 77 | 64 | 92 |
| Parmanent compression set (%) | 50 | 35 | 52 | 58 | 78 |
| Thermoplasticity | ○ | ○ | ○ | ○ | ○ |

TABLE 2

|  | Compar. Ex. | | | | | | | | |
| --- | --- | --- | --- | --- | --- | --- | --- | --- | --- |
|  | 1 | 2 | 3 | 4 | 5 | 6 | 7 | 8 | 9 |
| SIBS (Weight parts) | 100 | — | 100 | 100 | 100 | 100 | 100 | — | — |
| f-SIBS (Weight parts) | — | 100 | — | — | — | — | — | — | — |
| ARSIBS (Weight parts) | — | — | — | — | — | — | — | 100 | — |
| ARPIB (Weight parts) | — | — | — | — | — | — | — | — | 100 |
| HDPE (Weight parts) | — | — | 50 | — | — | — | — | — | — |
| IIR (Weight parts) | — | — | — | 100 | — | — | — | — | — |
| PP1 (Weight parts) | — | — | — | — | 25 | 35 | 25 | 25 | 25 |
| Plasticizer (Weight parts) | — | — | 60 | — | — | 60 | 100 | 100 | 100 |
| Crosslinking agent 1 (Weight parts) | 3 | 3 | 3 | — | — | — | — | — | — |
| Crosslinking agent 2 (Weight parts) | — | — | — | 10 | — | — | — | — | — |
| Auxiliary crosslinking agent 1 (Weight parts) | 5 | 5 | 5 | — | — | — | — | — | — |
| Auxiliary crosslinking agent 2 (Weight parts) | — | — | — | 5 | — | — | — | — | — |
| Auxiliary crosslinking agent 3 (Weight parts) | — | — | — | 1 | — | — | — | — | — |
| Hardness (JIS A: immediately after press) | 47 | 72 | 44 | 35 | 75 | 56 | 43 | Not molded | Not molded |
| Parmanent compression set (%) | 87 | 68 | 94 | 68 | 95 | 85 | 95 |  |  |
| Thermoplasticity | ◯ | X | ◯ | Δ | ◯ | ◯ | ◯ | ◯ | ◯ |

The thermoplastic elastomer composition of the invention, viz. Examples 1 to 5, showed low compressive set values as compared with the use of SIBS alone, thus being superior in permanent compression set characteristic while retaining the characteristics of an isobutylene block copolymer.

EXAMPLE 6

Using Labo Plastomill (manufactured by Toyo Seiki Seisaku-sho) set to 170° C., the ARSIBS prepared in Production Example 3 and PP2 were melt-kneaded together for 3 minutes. Then, crosslinking agent 3 was added in the proportion indicated in Table 3 and after addition of component (C) and 50 μl of hydrosilylation catalyst, the mixture was melt-kneaded at 170° C. for dynamic crosslinking until the torque value had reached a peak level. The resulting thermoplastic elastomer composition could be easily molded into a sheet with Shintoh Metal's hot-press at 180° C. The hardness, permanent compression set, and thermoplasticity of the sheet were measured by the methods described hereinbefore. The physical values of the sheet are presented in Table 3.

EXAMPLE 7

Except that the formulating level of component (C) was changed to 150 weight parts, the procedure of Example 6 was otherwise repeated to mold the resin composition into a sheet and evaluate its physical properties. The physical values are presented in Table 3.

EXAMPLE 8

Except that the formulating level of PP2, i.e. component (B), was changed to 35 weight parts, the procedure of Example 6 was otherwise repeated to mold the resin composition into a sheet and evaluate its physical properties. The physical values are presented in Table 3.

EXAMPLE 9

Except that PP3 was used for component (B) and that the formulating level of component (C) was changed to 50 weight parts, the procedure of Example 6 was otherwise repeated to mold the resin composition into a sheet and evaluate its physical properties. The physical values are presented in Table 3.

EXAMPLE 10

Except that PP3 was used for component (B), the procedure of Example 6 was otherwise repeated to mold the resin composition and the hardness, permanent compression set, thermoplasticity, dynamic viscoelasticity, and melting viscosity were determined by the methods described hereinbefore. The physical values thus found are presented in Tables 3 to 5.

EXAMPLE 11

Except that the formulating level of component (C) was changed to 200 weight parts, the procedure of Example 10 was otherwise repeated to mold the resin composition into a sheet and evaluate its physical properties. The physical values are presented in Table 3.

EXAMPLE 12

Except that the formulating level of component (B) was changed to 35 weight parts, the procedure of Example 10 was otherwise repeated to mold the resin composition into a sheet and evaluate its physical properties. The physical values are presented in Table 3.

EXAMPLE 13

Except that the formulating level of component (B) was changed to 50 weight parts, the procedure of Example 10 was otherwise repeated to mold the resin composition into a sheet and evaluate its physical properties. The physical values are presented in Tables 3 to 5.

EXAMPLE 14

Except that the formulating level of component (C) was changed to 0 weight part, the procedure of Example 13 was otherwise repeated to mold the resin composition into a sheet and evaluate its physical properties. The physical values are presented in Table 3.

EXAMPLE 15

Except that HDPE was used for component (B), the procedure of Example 6 was otherwise repeated to mold the resin composition into a sheet and evaluate its physical properties. The physical values are presented in Table 3.

EXAMPLE 16

Except that the formulating level of component (B) was changed to 100 weight parts, the procedure of Example 13 was otherwise repeated to mold the resin composition into a sheet and evaluate its physical properties. The physical values are presented in Tables 3 to 5.

EXAMPLE 17

Except that the formulating level of component (B) was changed to 250 weight parts, the procedure of Example 13 was otherwise repeated to mold the resin composition into a sheet and evaluate its physical properties. The physical values are presented in Table 3.

COMPARATIVE EXAMPLE 10

A resin composition comprising AES Japan's Santoplain 211-45, an olefinic thermoplastic elastomer was molded and the dynamic viscoelasticity and melting viscosity of the product were determined by the methods described hereinbefore. The physical values are shown in Tables 4, 5 and 7.

TABLE 5

| Shear rate (/s) | Viscosity (poise) | | | | | |
|---|---|---|---|---|---|---|
| | Ex. 10 | Ex. 13 | Ex. 16 | Ex. 27 | Ex. 28 | Compar. Ex. 10 |
| 12.16 | 11050 | 25620 | 36500 | 38500 | 15310 | 70500 |
| 1216 | 470 | 870 | 1080 | 1170 | 920 | 3790 |

The thermoplastic elastomer composition of the invention, specifically Examples 6, 7, 8, 9, 10 and 11, varied in hardness over a broad range of 41 to 74 (JIS A) including the hardness value of the isobutylene block copolymer SIBS as used alone in Comparative Example 1 (JIS A:47), and yet showed appreciably low permanent compression set values, i.e. of the order of 20%, as compared with SIBS as it is used alone. It is also apparent that compared with the case in which the crosslinking product of SIBS and IIR shown in Comparative Example 4 was used, the thermoplastic elastomer composition of the invention is superior in the parameter of permanent compression set.

Comparison of Example 10 with Comparative Example 10 for dynamic viscoelasticity reveals that Example 10 according to the invention has a higher tan δ value. The parameter tan δ represents the attenuation damping property of a vibration damping material and the higher the tan a value is, the more pronounced is the attenuation damping properties. In other words, Example 10 is superior in vibration damping property.

Comparison of Example 10 with Comparative Example 10 reveals that Example 10 is lower in viscosity, suggesting that it is superior in extrusion moldability and injection moldability.

EXAMPLE 18

TABLE 3

| | | Ex. | | | | | | | | | | | |
|---|---|---|---|---|---|---|---|---|---|---|---|---|---|
| | | 6 | 7 | 8 | 9 | 10 | 11 | 12 | 13 | 14 | 15 | 16 | 17 |
| Component (A) | ARSIBS (Weight parts) | 100 | 100 | 100 | 100 | 100 | 100 | 100 | 100 | 100 | 100 | 100 | 100 |
| Component (B) | PP2 (Weight parts) | 25 | 25 | 35 | — | — | — | — | — | — | — | — | — |
| Component (B) | PP3 (Weight parts) | — | — | — | 25 | 25 | 25 | 35 | 50 | 50 | — | 100 | 250 |
| Component (B) | HDPE (Weight parts) | — | — | — | — | — | — | — | — | — | 25 | — | — |
| Component (C) | PW-90 (Weight parts) | 100 | 150 | 100 | 50 | 100 | 200 | 100 | 100 | 0 | 100 | 100 | 100 |
| Crosslinking agent 3 (Weight parts) | | 9 | 9 | 9 | 9 | 9 | 9 | 9 | 9 | 9 | 9 | 9 | 9 |
| Hydrosilylation catalyst (ul) | | 50 | 50 | 50 | 50 | 50 | 50 | 50 | 50 | 50 | 50 | 50 | 50 |
| Parmanent compression set (%) | | 22 | 25 | 39 | 29 | 20 | 27 | 32 | 40 | 40 | 25 | 52 | 66 |
| Hardness (JIS A: immediately after press) | | 51 | 41 | 58 | 74 | 52 | 43 | 62 | 61 | 90 | 42 | 89 | 90 |
| Thermoplasticity | | ○ | ○ | ○ | ○ | ○ | ○ | ○ | ○ | ○ | ○ | ○ | ○ |

TABLE 4

| Temperature (° C.) | Ex. 10 | Ex. 13 | Ex. 16 | Ex. 18 | Ex. 27 | Ex. 28 | Compar. Ex. 10 |
|---|---|---|---|---|---|---|---|
| −65 | 0.42 | 0.16 | 0.27 | 0.47 | 0.20 | 0.21 | 0.14 |
| −45 | 0.75 | 0.45 | 0.40 | 0.69 | 0.35 | 0.41 | 0.32 |
| −25 | 0.29 | 0.25 | 0.20 | 0.32 | 0.27 | 0.20 | 0.17 |

Using Labo Plastomill (manufactured by Toyo Seiki Seisaku-sho) set to 170° C., ARPIB, PP2, and component (C) were melt-kneaded in the ratio indicated in Table 6 for 3 minutes, at the end of which time the crosslinking agent 3 was added in the proportion indicated in Table 6. Then, 50 μl of the hydrosilylation catalyst was added and the melt-kneading was further carried out at 170° C. for dynamic crosslinking until the torque value had reached a peak level. The resulting thermoplastic elastomer composition could be easily molded into a sheet by using Shintoh Metal's hot-press at 180° C. The hardness, permanent compression set, and thermoplasticity of the sheet thus obtained were determined by the methods described hereinbefore. The physical values of the sheet are presented in Table 6. The dynamic viscoelasticity of the sheet was also determined by the method described hereinbefore. The results are presented in Table 4.

EXAMPLE 19

Except that the formulating level of component (C) was changed to 100 weight parts, the procedure of Example 18 was otherwise repeated to mold the resin composition into a sheet and evaluate its physical properties. The physical values are presented in Table 6.

EXAMPLE 20

Except that the formulating level of component (C) was changed to 150 weight parts, the procedure of Example 18 was otherwise repeated to mold the resin composition into a sheet and evaluate its physical properties. The physical values are presented in Table 6.

EXAMPLE 21

Except that the formulating level of component (C) was changed to 200 weight parts, the procedure of Example 18 was otherwise repeated to mold the resin composition into a sheet and evaluate its physical properties. The physical values are presented in Table 6.

EXAMPLE 22

Except that the formulating level of PP2 was changed to 35 weight parts, the procedure of Example 19 was otherwise repeated to mold the resin composition into a sheet and evaluate its physical properties. The physical values are presented in Table 6.

EXAMPLE 23

Except that the formulating level of component (C) was changed to 250 weight parts, the procedure of Example 19 was otherwise repeated to mold the resin composition into a sheet and evaluate its physical properties. The physical values are presented in Table 6.

EXAMPLE 24

Except that the formulating level of PP2 was changed to 50 weight parts, the procedure of Example 21 was otherwise repeated to mold the resin composition into a sheet and evaluate its physical properties. The physical values are presented in Table 6.

EXAMPLE 25

Except that PP3 was used in lieu of PP2 for component (B), the procedure of Example 19 was otherwise repeated to mold the resin composition into a sheet and evaluate its physical properties. The physical values are presented in Table 6.

EXAMPLE 26

Except that the formulating level of component (C) was changed to 150 weight parts, the procedure of Example 25 was otherwise repeated to mold the resin composition into a sheet and evaluate its physical properties. The physical values are presented in Table 6.

EXAMPLE 27

Except that the formulating level of PP3 was changed to 50 weight parts, the procedure of Example 25 was otherwise repeated to mold the resin composition into a sheet and evaluate its hardness, permanent compression set, thermoplasticity, and melting viscosity by the methods described hereinbefore. The physical values are presented in Tables 4 to 6.

EXAMPLE 28

Except that the formulating level of PP3 was changed to 100 weight parts, the procedure of Example 25 was otherwise repeated to mold the resin composition into a sheet and evaluate its hardness, permanent compression set, thermoplasticity, and melting viscosity by the methods described hereinbefore. The physical values are presented in Tables 4 to 6.

COMPARATIVE EXAMPLE 11

ARPIB, crosslinking agent 3, and hydrosilylation catalyst were evenly admixed in the ratio indicated in Table 7 at room temperature and the mixture was poured in a metal mold and allowed to stand at 150° C. for 24 hours to let the crosslinking reaction go to completion. The physical properties of the resulting molding were evaluated. The physical values are presented in Table 7.

TABLE 6

| | | Ex. | | | | | | | | | | |
|---|---|---|---|---|---|---|---|---|---|---|---|---|
| | | 18 | 19 | 20 | 21 | 22 | 23 | 24 | 25 | 26 | 27 | 28 |
| Component (A) | ARPIB (Weight parts) | 100 | 100 | 100 | 100 | 100 | 100 | 100 | 100 | 100 | 100 | 100 |
| Component (B) | PP2 (Weight parts) | 25 | 25 | 25 | 25 | 35 | 35 | 50 | — | — | — | — |
| Component (B) | PP3 (Weight parts) | — | — | — | — | — | — | — | 25 | 25 | 50 | 100 |
| Component (C) | PW-90 (Weight parts) | 50 | 100 | 150 | 200 | 100 | 250 | 200 | 100 | 150 | 100 | 100 |
| Crosslinking agent 3 (Weight parts) | | 9 | 9 | 9 | 9 | 9 | 9 | 9 | 9 | 9 | 9 | 9 |
| Hydrosilylation catalyst (ul) | | 50 | 50 | 50 | 50 | 50 | 50 | 50 | 50 | 50 | 50 | 50 |

TABLE 6-continued

| | Ex. | | | | | | | | | | |
|---|---|---|---|---|---|---|---|---|---|---|---|
| | 18 | 19 | 20 | 21 | 22 | 23 | 24 | 25 | 26 | 27 | 28 |
| Parmanent compression set (%) | 22 | 21 | 22 | 29 | 43 | 26 | 33 | 25 | 28 | 44 | 52 |
| Hardness (JIS A: immediately after press) | 72 | 60 | 37 | 28 | 67 | 42 | 51 | 52 | 26 | 77 | 89 |
| Thermoplasticity | ○ | ○ | ○ | ○ | ○ | ○ | ○ | ○ | ○ | ○ | ○ |

TABLE 7

| | Compar. Ex. | |
|---|---|---|
| | 10 | 11 |
| Component (A) ARPIB (Weight parts) | — | 100 |
| Crosslinking agent 3 (Weight parts) | — | 9 |
| Hydrosilylation catalyst (ul) | — | 50 |
| Parmanent compression set (%) | 21 | 7 |
| Hardness (JIS A: immediately after press) | 56 | 20 |
| Thermoplasticity | ○ | X |

The thermoplastic elastomer composition of the invention, specifically Examples 18, 19, 20 and 21, varied widely in hardness over the range of 28–72 (JTS A), and, yet, showed permanent compression set values of the order of 20%, thus having good compression set characteristics and thermoplasticity while retaining the characteristics of an isobutylene polymer. It is also apparent that compared with Santoplain 211-45 shown in Comparative Example 10, the composition of the invention is lower in hardness and excellent in the vibration damping property with a high value of tan δ which is a marker of vibration damping property.

INDUSTRIAL APPLICABILITY

The thermoplastic elastomer composition of the invention has thermoplasticity with good rubber-like characteristics and is excellent not only in moldability but also in both permanent compression set and vibration damping properties so that it can be used in a variety of applications such as sealing materials, vibration damping materials, and vibration preventing materials.

The invntion claimed is:

1. A thermoplastic elastomer composition comprising an unsaturated bond-containing isobutylene polymer (A), an olefinic resin (B), and a hydrosilyl group-containing compound as a cross-linking agent,
    wherein the unsaturated bond-containing isobutylene polymer (A) contains an average of 1 to 10 unsaturated bond per molecule and the crosslinking of the unsaturated bond-containing isobutylene polymer (A) is effected by the dynamic crosslinking at melt-kneading of the unsaturated bond-containing isobutylene polymer (A) with the olefinic resin (B).

2. The thermoplastic elastomer composition according to claim 1,
    wherein the unsaturated bond-containing isobutylene polymer (A) is a block copolymer comprising a polymer block (a) composed predominantly of isobutylene and a polymer block (b) composed predominantly of an aromatic vinyl compound.

3. The thermoplastic elastomer composition according to claim 1,
    wherein the unsaturated bond-containing isobutylene polymer (A) is an alkenyl group-terminated polymer.

4. The thermoplastic elastomer composition according to claim 1,
    wherein the olefinic resin (B) content is 10 to 200 weight parts relative to 100 weight parts of the unsaturated bond-containing isobutylene polymer (A).

5. The thermoplastic elastomer composition according to claim 1,
    wherein the unsaturated bond-containing isobutylene polymer (A) is a polymer produced by synthesizing an isobutylene polymer not containing an unsaturated bond in the first place and then introducing an unsaturated bond thereinto.

6. The thermoplastic elastomer composition according to claim 1,
    wherein the unsaturated bond-containing isobutylene polymer (A) is an allyl-terminated polymer produced by causing allyltrimethylsilane to act on a polymer not containing an unsaturated bond at the molecular chain terminus but terminating in a chlorine atom.

7. The thermoplastic elastomer composition according to claim 2,
    wherein the unsaturated bond-containing isobutylene polymer (A) contains said unsaturated bond within the molecular chain of the polymer block (b) composed predominantly of an armatic vinyl compound.

8. The thermoplastic elastomer composition according to claim 1,
    wherein the unsaturated bond-containing isobutylene polymer (A) has an intermolecularly crosslinked structure.

9. The thermoplastic elastomer composition according to claim 1, comprising a plasticizer (C).

10. The thermoplastic elastomer composition according to claim 1,
    wherein the unsaturated bond-containing isobutylene polymer (A) is a polymer having a number average molecular weight of 1,000 to 500,000.

11. The thermoplastic elastomer composition according to claim 1,
    wherein the unsaturated bond-containing isobutylene polymer (A) contains a monomer unit derived from isobutylene in a proportion of not less than 50 weight % based on the total weight of the polymer (A).

12. The thermoplastic elastomer composition according to claim 1,
    wherein the olefinic resin (B) is polyethylene or polypropylene.

13. The thermoplastic elastomer composition according to claim 9, wherein the plasticizer (C) is a paraffinic oil.

* * * * *